United States Patent
Hodgman et al.

(10) Patent No.: US 11,522,886 B2
(45) Date of Patent: Dec. 6, 2022

(54) MULTI-STAGE SCANNING OF COMPUTER DEVICES FROM DIFFERENT GEOGRAPHIC LOCATIONS

(71) Applicant: Rapid7, Inc., Boston, MA (US)

(72) Inventors: Roy Hodgman, Cambridge, MA (US); Jonathan Hart, Kernville, CA (US)

(73) Assignee: Rapid7, Inc., Boston, MA (US)

( * ) Notice: Subject to any disclaimer, the term of this patent is extended or adjusted under 35 U.S.C. 154(b) by 0 days.

(21) Appl. No.: 17/730,053

(22) Filed: Apr. 26, 2022

(65) Prior Publication Data

US 2022/0255956 A1  Aug. 11, 2022

Related U.S. Application Data

(63) Continuation of application No. 17/379,869, filed on Jul. 19, 2021, now Pat. No. 11,431,739, which is a continuation of application No. 16/443,194, filed on Jun. 17, 2019, now Pat. No. 11,102,222.

(51) Int. Cl.
*H04L 9/40* (2022.01)
*H04L 69/16* (2022.01)
*H04W 8/00* (2009.01)
*H04L 67/02* (2022.01)

(52) U.S. Cl.
CPC ...... *H04L 63/1416* (2013.01); *H04L 63/1425* (2013.01); *H04L 69/16* (2013.01); *H04W 8/005* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 9,537,808 B1 | 1/2017 | Giansiracusa et al. | |
| 10,764,313 B1* | 9/2020 | Mushtaq | G06N 20/00 |
| 10,841,340 B2 | 11/2020 | Leap et al. | |
| 11,223,637 B2 | 1/2022 | Neuvirth et al. | |
| 2003/0212779 A1 | 11/2003 | Boyter et al. | |
| 2005/0180398 A1 | 8/2005 | Deno et al. | |
| 2006/0174337 A1 | 8/2006 | Bernoth | |
| 2006/0191010 A1 | 8/2006 | Benjamin | |
| 2008/0276317 A1 | 11/2008 | Chandola et al. | |
| 2012/0072548 A1 | 3/2012 | Kim | |
| 2018/0270229 A1 | 9/2018 | Zhang et al. | |
| 2019/0268398 A1 | 8/2019 | Suriarachchi et al. | |
| 2019/0342179 A1 | 11/2019 | Barnard et al. | |
| 2020/0059480 A1* | 2/2020 | Junod | H04L 63/1425 |
| 2020/0162391 A1* | 5/2020 | Savalle | G06N 20/00 |
| 2020/0314134 A1* | 10/2020 | Izrael | G06F 21/552 |
| 2021/0028991 A1* | 1/2021 | Nataraj | H04L 41/5045 |
| 2021/0067547 A1 | 3/2021 | Hale | |
| 2021/0084074 A1 | 3/2021 | Kimer et al. | |

(Continued)

*Primary Examiner* — Quang N Nguyen

(74) *Attorney, Agent, or Firm* — Ashwin Anand

(57) ABSTRACT

Methods and systems for scanning a network. The disclosed methods may involve receiving a list of a plurality of target devices and scanning a first device to determine if a particular port and protocol combination appears to be open on the first device. Upon determining that a particular port and protocol combination appears to be open on the first device, the method involves interrogating the first device before or during scanning of a second device to gather data regarding a service running on the first device.

20 Claims, 4 Drawing Sheets

(56) References Cited

U.S. PATENT DOCUMENTS

| | | | |
|---|---|---|---|
| 2021/0120042 A1 | 4/2021 | Lopez et al. | |
| 2021/0160263 A1 | 5/2021 | Jiang et al. | |
| 2021/0306341 A1 | 9/2021 | Tiwari et al. | |
| 2021/0367847 A1* | 11/2021 | Vasseur | H04L 43/10 |
| 2022/0103592 A1* | 3/2022 | Semel | H04L 63/20 |

* cited by examiner

MULTI-STAGE SCANNING OF COMPUTER DEVICES FROM DIFFERENT GEOGRAPHIC LOCATIONS

This application is a continuation of U.S. patent application Ser. No. 17/379,869, filed Jul. 19, 2021, which is a continuation of U.S. patent application Ser. No. 16/443,194, filed Jun. 17, 2019, now U.S. Pat. No. 11,102,222, which are hereby incorporated in reference herein in their entirety.

TECHNICAL FIELD

Embodiments described herein generally relate to systems and methods for monitoring networks and, more particularly but not exclusively, to systems and methods for scanning devices or addresses on a network.

BACKGROUND

Due to their prevalence in today's society, the internet and other types of networks have become hubs for criminal activity. Often times cyber-criminals or other threat actors attempt to install or otherwise deploy harmful applications on unprotected systems. Once a threat actor obtains access to a target system or device, they may perform further actions such as stealing data, escalating their privileges, or the like.

There are a variety of products or projects that seek to study the characteristics of devices exposed on networks such as the internet. These projects usually involve collecting information from endpoints that are listening on the internet. The collected data may be used in security research, product development, and other efforts. However, these collection projects are generally time consuming and resource intensive.

A need exists, therefore, for more efficient systems and methods for scanning networks.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for scanning a network. The method includes receiving a list of a plurality of target devices, wherein the list includes at least a first device and a second device, scanning the first device to determine if a particular port and protocol combination appears to be open on the first device, and upon determining that the particular port and protocol combination appears to be open on the first device, interrogating the first device before or during scanning of the second device to gather data regarding a service running on the first device.

In some embodiments, the interrogation comprises connecting to the first device using transmission control protocol (TCP) or user datagram protocol (UDP).

In some embodiments, the method further includes receiving metadata specifying port and protocol combinations for scanning.

In some embodiments, the list of the plurality of target devices includes devices that specifically have not opted out from being scanned.

In some embodiments, the method further includes storing target devices with the open port and protocol combinations in a queueing service.

In some embodiments, the method further includes processing an opt-out request from a target.

In some embodiments, the list of the plurality of target devices includes at least one of an IP address and a host name for each of the plurality of target devices.

In some embodiments, interrogating the first device comprises interrogating the first device from a plurality of interrogation locations.

In some embodiments, the interrogated device is an HTTP server, and the method further comprises organizing data from the interrogation into objects representing HTTP responses.

In some embodiments, scanning the first device involves scanning the first device from a plurality of locations.

According to another aspect, embodiments relate to a system for scanning a network. The system includes an interface for at least receiving a list of a plurality of target devices, wherein the list includes at least a first device and a second device, a scanning module configured to scan the first device to determine if a particular port and protocol combination appears to be open on the first device, and a first collection device configured to, upon the scanning module determining that the particular port and protocol combination appears to be open on the first device, interrogate the first device before or during scanning of the second device to gather data regarding a service running on the first device.

In some embodiments, the interrogation involves connecting to the first device using transmission control protocol (TCP) or user datagram protocol (UDP).

In some embodiments, the scanning module is further configured to receive metadata specifying port and protocol combinations for scanning.

In some embodiments, the list of the plurality of target devices includes devices that specifically have not opted out from being scanned.

In some embodiments, the system further includes a queueing service to store target devices with the open port and protocol combinations.

In some embodiments, the interface is further configured to process an opt-out request from a target.

In some embodiments, the list of the plurality of target devices includes at least one of an IP address and a host name for each of the plurality of target devices.

In some embodiments, the system further includes a second collection device configured to interrogate the first device from a different location than the first collection device to observe trends from differing collection points.

In some embodiments, the interrogated device is an HTTP server, and the system further includes a processing module configured to organize data from the interrogation into objects representing HTTP responses.

In some embodiments, the first device is scanned from a plurality of locations.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
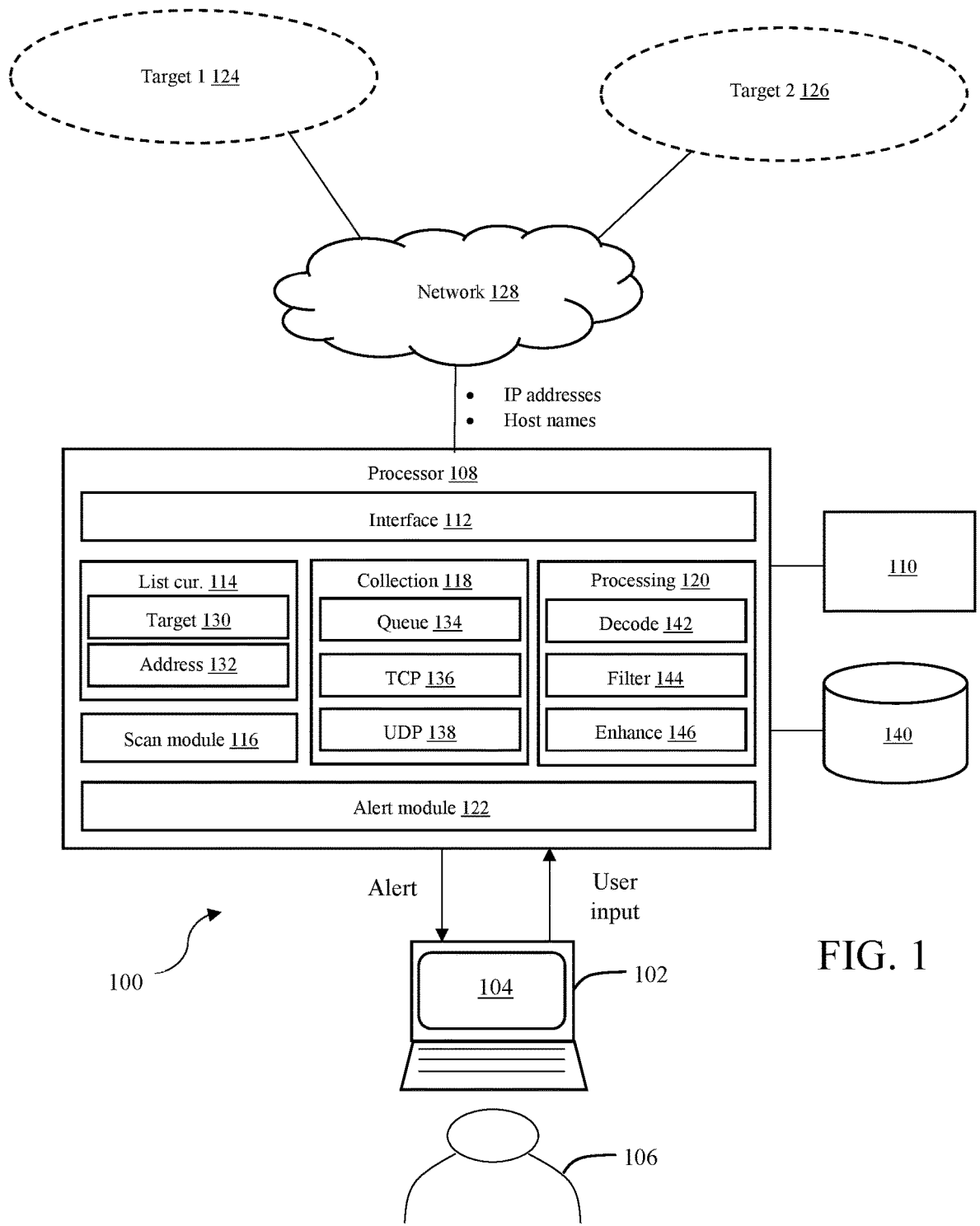
FIG. 1 illustrates a system for scanning a network in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the descriptions that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The systems and methods described herein provide novel techniques for scanning endpoints or devices on a network. As discussed previously, existing products or techniques for scanning a network are generally time consuming and resource intensive.

Features of the systems and methods described herein split the scanning process into multiple, distinct stages. The first stage is a preparation stage that involves the creation and curation of a list of addresses or host names to be scanned or otherwise studied. The second stage is a scanning stage that involves scanning the endpoints or devices to determine which of them are applicable for further analysis. The third stage is a collection or interrogation stage that involves collecting more detailed data regarding a target identified in the scanning stage.

By splitting the effort into multiple stages, the systems and methods described herein can take advantage of multiple service providers while abiding by their policies related to scanning. Additionally, the systems and methods herein can leverage the benefits that result from parallel scanning and processing to make the overall process more efficient and timely.

For example, the disclosed embodiments provide the ability to start the collection or interrogation stage as the results from the second stage (i.e., the scanning stage) are obtained. This makes it easier to see and validate results more rapidly.

This is opposed to existing products and techniques for conducting network scans and analyses, which generally require bulk scanning followed by investigating. For example, existing techniques generally require scanning all targets before beginning a collection stage. Products or projects reliant on these techniques therefore require a long time to complete before obtaining any useful data.

The embodiments of the systems and methods described herein provide a number of advantages over existing techniques. Splitting the overall process into discrete scanning, collecting, and processing stages allows the systems and methods described herein to concurrently process findings associated with individual targets. This allows for results to be obtained and analyzed more quickly than possible with existing techniques.

Similarly, the collection efforts use infrastructure that provides opportunities for horizontal scaling, thereby reducing the time required to complete the study. This also enables analysts to study changes in the state of the network of interest over very short periods—a task nearly impossible with existing techniques.

Different service providers may each have different policies related to scanning. However, most service providers have a negative view regarding scanning as scanning (e.g., port scanning) is often associated with malicious activity. By separating the often abused scanning portion of the intelligence gathering effort, the systems and methods described herein are able to minimize the abuse and potential legal ramifications by utilizing friendly infrastructure to conduct the riskier portions of the research.

Existing techniques also conduct their scanning operations from a fixed scan point, which has several disadvantages. One disadvantage is that fixed scanning locations are often blacklisted by filtering technologies, thereby cutting off access to potentially interesting swaths of an address space. Another disadvantage with fixed scanning locations is that the network source of the scans may likely incur an increase in abuse or opt-out requests. Additionally, observations made from fixed scanning locations may have a bias due to restrictions placed by or on specific infrastructure providers, geographic regions, or the like.

The embodiments described herein, on the other hand, may conduct these collection efforts from multiple locations on a network to obtain a more comprehensive view thereof. This enables interested parties to learn about how different parts of the network communicate with and present themselves to each other. For example, by comparing collection results for an entity based on data from two or more collection nodes (e.g., at different geographic locations, from different providers, etc.), the embodiments described herein can observe differences in what a particular target is offering how or it behaves.

FIG. 1 illustrates a system 100 for scanning a network in accordance with one embodiment. The system 100 includes a user device 102 executing a user interface 104 for presentation to one or more users 106 such as security personnel or other users interested in monitoring a network.

The user device 102 may be any hardware device capable of executing the user interface 104. The user device 102 may be configured as a laptop, PC, tablet, mobile device, or the like. The exact configuration of the user device 102 may vary as long as it can execute and present the user interface 104 to the user 106. The user interface 104 may allow the user 106 to input parameters regarding targets, metrics of a study, providers, or the like.

The user device 102 may be in operable communication with one or more processors 108. The processors 108 may be any hardware device capable of executing instructions stored on memory 110 to accomplish the objectives of the various embodiments described herein. The processor(s) 108 may be implemented as software executing on a microprocessor, a field programmable gate array (FPGA), an application-specific integrated circuit (ASIC), or another similar device whether available now or invented hereafter.

In some embodiments, such as those relying on one or more ASICs, the functionality described as being provided in part via software may instead be configured into the design of the ASICs and, as such, the associated software may be omitted. The processor(s) 108 may be configured as part of the user device 102 on which the user interface 104 executes, such as a laptop, or may be located on a different computing device, perhaps at some remote location.

The processor 108 may execute instructions stored on memory 110 to provide various modules to accomplish the objectives of the various embodiments described herein. Specifically, the processor 108 may execute or otherwise include an interface 112, a list curation module 114, a scanning module 116, a collection or interrogation module 118, and a processing module 120. The processor 108 may further execute an alert module 122 to inform the user 106 regarding any detected instances of network activity or data that may be of interest to the user 106.

The interface 112 may be in communication with one or more targets 124 and 126 over one or more networks 128. The targets 124 and 126 may each be associated with a plurality of targeted IP addresses, hostnames, and/or devices that the user 106 would like to monitor.

The network(s) 128 may link the various devices with various types of network connections. The network(s) 128 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 128 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

In operation, the interface 112 may receive one or more targets 124 and 126 (i.e., IP addresses) that are available for studying. As discussed previously, certain IP addresses may be unwilling to be scanned as scanning is often indicative of malicious activity.

Accordingly, targets 124 and 126 may "opt out" from being studied. In this case, these IP addresses may be placed on an opt-out list indicating they should not be studied. The systems and methods described herein may assume that if an IP address hasn't explicitly asked for an opt-out, the IP address is available for studying.

The list curation module 114 may create and maintain a list of IP addresses and/or host names to be included in future studies as potential targets. The list curation module 114 may execute target instructions 130 such that only host names or IP addresses associated with a particular target (e.g., a target that has not "opted out") are studied. Additionally or alternatively, the list curation module 114 may execute address instructions 132 such that only certain addresses (e.g., addresses belonging to a certain range of addresses) are studied.

Once the list curation module 114 generates the list, the scanning module 116 may then perform some examination or scanning procedure to determine which devices, hostnames, addresses, etc., on the list are available for further study. For example, the scanning module 116 may take as its primary input a list of targets in the form of IP addresses or host names. The scanning module 116 may also receive some metadata that specifies what about the target should be studied. This additional metadata may relate to, for example, some transport layer port and protocol of interest.

The scanning module 116 may be implemented using any commercially available port scanning tool. The scanning module 116 may be configured using any type of scanning technology, whether available now or invented hereafter, as long as it can conduct the operations required to accomplish the objectives of the embodiments described herein.

The scanning module 116 may return a list of IP addresses, hostnames, etc., that at least appear to have the desired port and protocol combination open or otherwise publicly accessible. This list may be provided to the collection module 118, where it may be stored in a queueing service 134.

For example, the queueing service 134 may be implemented as REDIS® software or AMAZON® SQS. The exact type of queueing service 134 used may vary and may include any type of in-memory data structure whether available now or invented hereafter as long as the objectives of the various embodiments described herein may be accomplished.

The collection stage may begin as addresses or hostnames applicable for further study are identified and stored in the queuing service 134. This collection stage may also be referred to as the interrogation stage.

The particulars regarding the performance of this collection stage may depend largely on what is being studied. However, the collection stage generally involves connecting to a UDP or TCP port of a target identified as available or otherwise open in the scanning stage. Accordingly, the collection module 118 may include TCP instructions 136 and/or UDP instructions 138 for connecting to a TCP or UDP port, respectively, of a target.

Once connected to a target, the collection module 118 may interact with a service listening on that target and store data related to that interaction. The gathered data may be stored in one or more databases 140.

The output of the collection module 118 regarding a particular target may be a document that describes the target (e.g., by an IP address or a hostname) as well as metadata specific to the collection or interrogation task at hand. This document may be formatted in JSON, for example, or any other suitable type of format.

The metadata may include data observed while communicating with a TCP or UDP port on the target. For example, the following JSON segment shows one possible way of storing results from interacting with address 192.168.1.1: 80/TCP:

```
{
"ip": "192.168.1.1",
"port": "80",
"data": ""
}
```

The processing module 120 may analyze the results of the collection stage and perform any required or otherwise desired processing procedures. For example, the processing module 120 may execute one or more of decoding instructions 142, filtering instructions 144, and enhancing instructions 146.

When executed by the processing module 120, the decoding instructions 142 may take the raw data collected from the target(s) and transform it into something that is conducive to further analysis. For example, the decoding instructions 142 may transform the data into a form that is applicable to the particular study at hand or at least into a form that is useful to the tools and persons involved.

For example, a particular study may be conducted to explore the responses of HTTP servers that listen on a given TCP port. In this type of study, the decoding instructions 142 may cause the processing module 120 to decode the raw bytes received at the endpoints into objects that represent the HTTP response headers and body.

Some amount of noise or useless data may be collected during a study. Accordingly, when executed by the processing module 120, the filtering instructions 144 may cause the processing module 120 to filter out these anomalous responses. In other cases, these anomalous responses may represent interesting data for further study.

When executed by the processing module 120, the enhancing instructions 146 may cause the processing module 120 to provide additional data that may not be initially known during the scanning or collection stages. For example, by utilizing various IP metadata databases, the enhancing instructions 146 may enable the processing module 120 to enhance the JSON results for a given target with geographic data such as latitude, longitude, locality, as well as the entity that owns the target(s) under analysis.

The processing module 120 may perform any other type of processing procedures depending on the needs of the study or the end user. These may include comparisons, summarizations, or the like. Upon the completion of a study, a variety of actions can occur that, for example, compare, summarize, or report on the data obtained during the study.

Figure 2A:
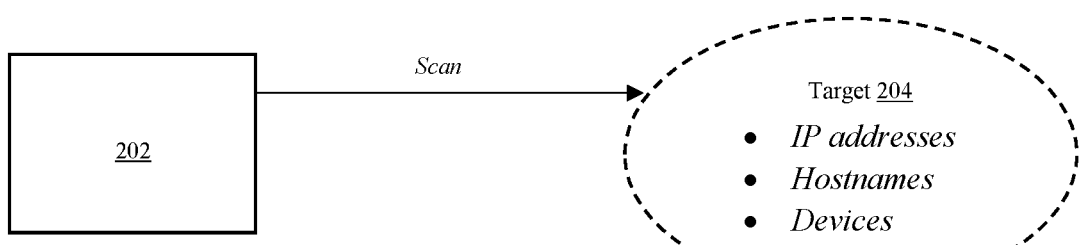
FIGS. 2A-D illustrate a workflow of scanning a network in accordance with one embodiment.

FIGS. 2A-D illustrate an exemplary workflow of scanning a network in accordance with one embodiment. FIG. 2A illustrates a processor 202 such as the processor 108 of FIG. 1 scanning IP addresses, hostnames, or the like associated with a particular target 204. As discussed previously, the target 204 may be a specific target that has not opted out from having its devices, hosts, or IP addresses being examined. A scanning module such as the scanning module 116 of FIG. 1 may conduct these scans.

Figure 2B:
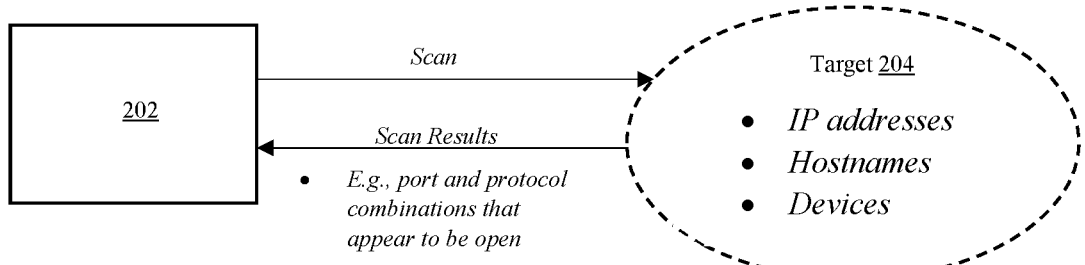

FIG. 2B illustrates results of the scans from FIG. 2A being returned to the processor 202. For example, the results may indicate which port and protocol combinations appear to be open. It is noted that these results may be returned to the processor 202 as the processor 202 continues to scan other IP addresses, hostnames, devices, etc. associated with the target 204.

The results of the scans may be provided to a queueing service such as the queueing service 134 of FIG. 1. The collection phase may begin as these scan results are received.

Figure 2C:
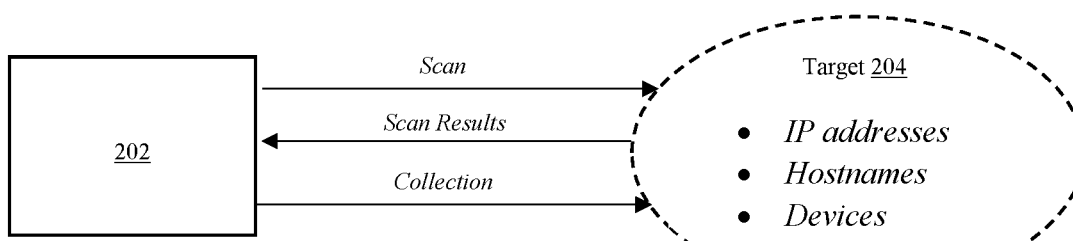

FIG. 2C illustrates the processor 202 initiating a collection or interrogation phase. As discussed previously, the particulars regarding the performance of the collection phase may depend on the purpose of the study.

For example, the collection phase may involve connecting to a UDP or TCP port of a target identified in the scan results as, for example, having particular port and protocol combinations appearing to be open. A collection module such as the collection module 118 of FIG. 1 may perform this collection stage.

Figure 2D:
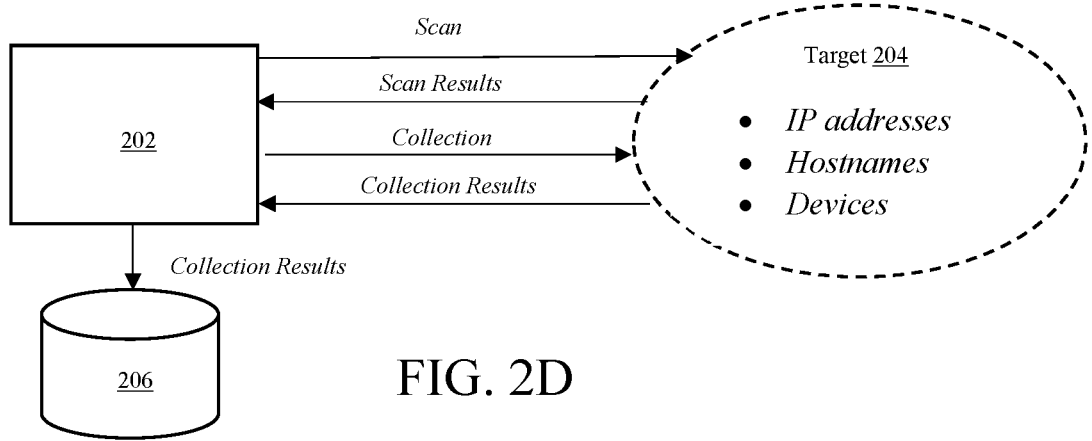

Once connected to an endpoint, the processor 202 may interact with any services listening thereon. As seen in FIG. 2D, the processor 202 may then store results of the collection stage in one or more databases 206.

The final output of the collection phase may be a compressed archive of all of the output documents for each target. These may be communicated to a processing module such as the processing module 120 of FIG. 1 to conduct the previously-discussed processing steps.

It is noted that the stages illustrated in FIGS. 2A-D may be performed simultaneously. For example, after scanning a first set of IP addresses, the collection stage may occur with respect to the first set of IP addresses as a second set of IP addresses is scanned. Collection results may similarly be processed and analyzed as other sets of IP addresses are scanned. By contrast, existing techniques generally first require addresses or hosts to be scanned in bulk; only after an entire block of addresses is scanned can the collection phase begin.

The collection phase in accordance with the embodiments described herein may scale horizontally relative to the number of applicable targets in order to complete the collection activities in a timely manner. For example, targets for collection activities are distributed to collection nodes in batches of a configurable size, and these collection activities may occur from dedicated collection nodes deployed globally across a variety of infrastructures. The infrastructure may of course vary as multiple providers may be used. Additionally, the systems and methods described herein may perform collection activities across the regions, zones, or locales that are supported by a given provider.

Figure 3:
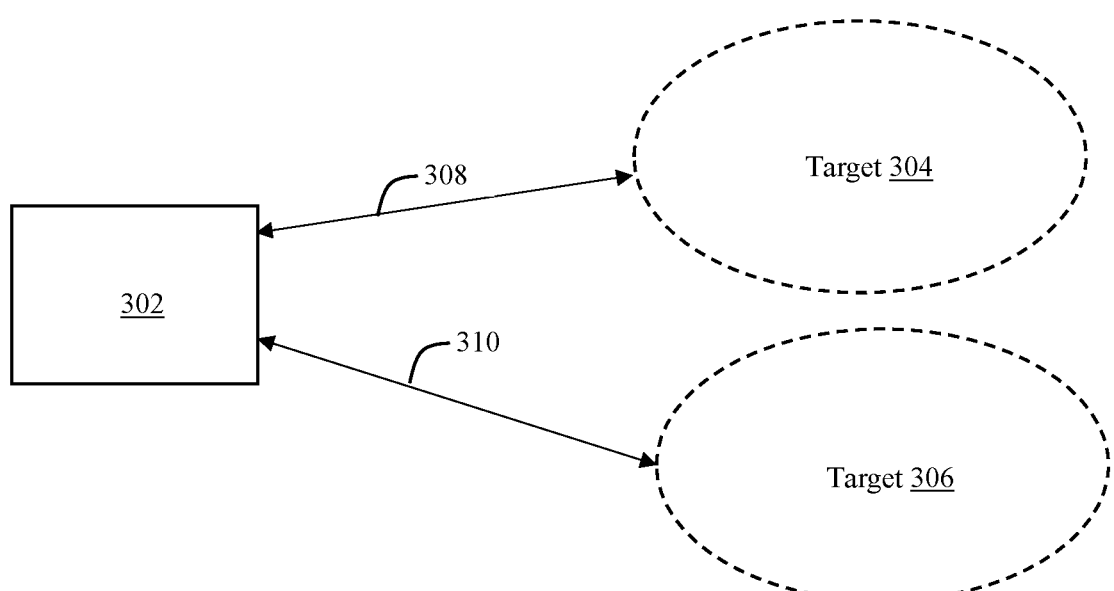
FIG. 3 illustrates a processor interacting with multiple targets in accordance with one embodiment.

FIG. 3, for example, illustrates a processor 302 such as the processor 108 interacting with targets 304 and 306. The bi-directional arrows 308 and 310 may represent the interactions or stages of FIGS. 2A-D. As seen in FIG. 3, a single processor 302 may conduct the above-discussed analyses with respect to e.g., IP addresses associated at least two different targets 304 and 306.

Figure 4:
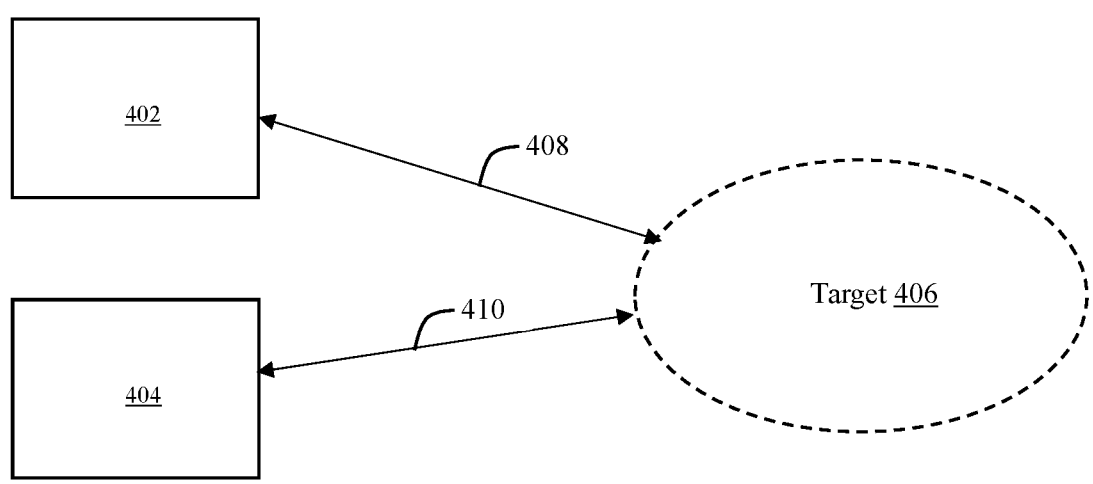
FIG. 4 illustrates multiple processors interacting with the same target in accordance with one embodiment.

FIG. 4, on the other hand, illustrates two different processors 402 and 404 such as the processor 108 of FIG. 1 interacting with a single target 406. The bi-directional arrows 408 and 410 indicate the interactions or stages of FIGS. 2A-D. As seen in FIG. 4, two or more processors 402 and 404 may conduct the above-discussed analyses with respect to, e.g., IP addresses associated with the same target 406.

In order to account for complications related to IP addresses, regional requirements, ASN, etc., the scanning and collection stages can be tuned to run from specific collection locations allowed by the deployed infrastructure.

Once the collection results are obtained, a processing module such as the processing module 120 of FIG. 1 may perform any required processing and analyzing steps. For example, referring back to FIG. 1, the processing module 120 may analyze results by locality, ASN, or by any other identifying characteristics of the target(s).

The processor 108 may also conduct a protocol-specific analysis of responses. For example, for HTTP-based studies, these may include the analysis of data points related to HTTP response headers, body, or status code.

The processor 108 may also compare results of two or more studies conducted over a period of time or from different collection locations to observe a variety of data such as changes occurring over time. This could allow researchers to observe trends in, for example, patching, configuration changes, etc. This could help researchers determine whether organizations took steps that researchers had previously recommended.

The systems and methods described herein may also allow researchers to observe trends related to differences or peculiarities between similar collection activities conducted from different collection points. Observed differences may be based on regional influences, provider influences, locality influences, or the like.

The infrastructure in which the system 100 of FIG. 1 is deployed should support the handling, writing, and transferring of large amounts of data. Accordingly, given the potential for resource-intensive activity to occur during the processing stage, the disclosed technology can spread the load of processing over dedicated processing points that may scale up as demand increases and capacity allows. Similarly, the processing stage can occur at a service provider separate than that of the collection stage, provided that end users tailor the specific technologies available in the provider's infrastructure.

Figure 5:
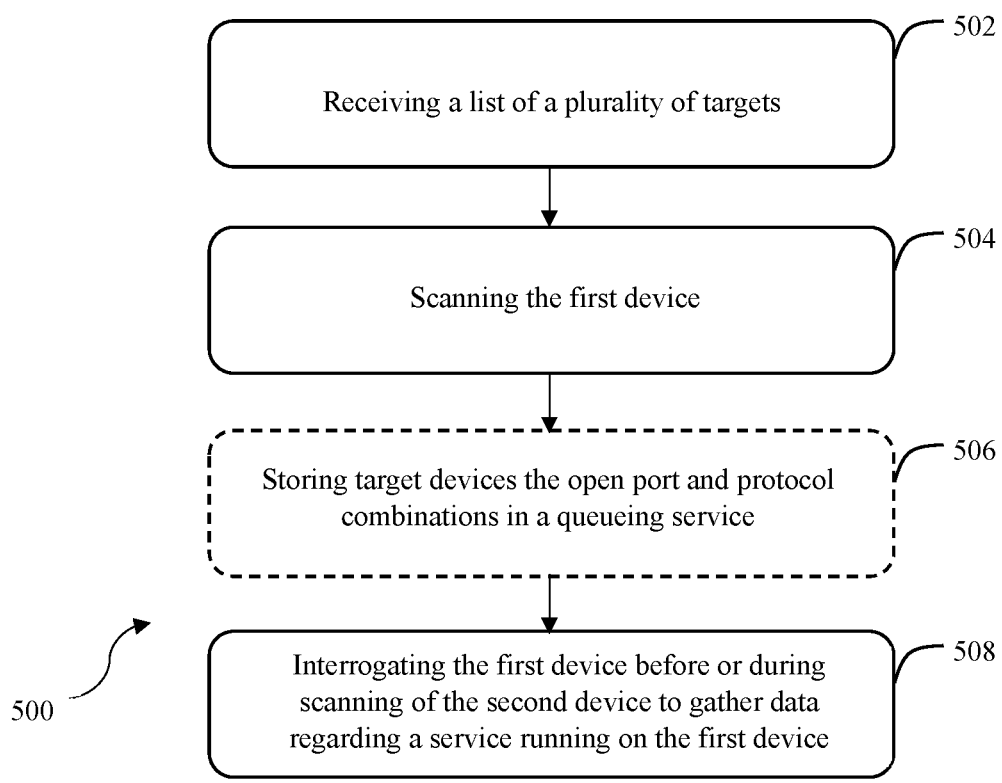
FIG. 5 depicts a flowchart of a method for scanning a network in accordance with one embodiment.

FIG. 5 depicts a flowchart of a method 500 for scanning a network in accordance with one embodiment. Step 502 involves receiving a list of a plurality of target devices, wherein the list includes at least a first device and a second device. The first and second devices may be associated with a target that has not specifically "opted out" from being studied.

In some embodiments, the received list may include metadata specifying port and protocol combinations to be scanned. The received list may also include at least one of an IP address and a host name for each of the plurality of target devices. The scanning stage may also be conducted from a plurality of different locations.

Step 504 involves scanning the first device to determine if a particular port and protocol combination appears to be open on the first device. Step 504 may be performed by a scanning module such as the scanning module 116 of FIG. 1.

Step 506 involves storing target devices with the open port and protocol combinations in a queueing service.

Step 508 involves, upon determining that the particular port and protocol combination appears to be open on the first device, interrogating the first device before or during scanning of the second device to gather data regarding a service running on the first device. Step 508 may be performed by a collection module such as the collection module 114 of FIG. 1. In some embodiments, the interrogation may involve connecting to the first device using transmission control protocol (TCP) or user datagram protocol (UDP). The interrogation/collection stage may be conducted from a plurality of different locations as well.

As discussed previously, the specifics of the interrogation stage may depend on the purpose of the study. For example, in some embodiments the interrogated device may be an HTTP server and the method 500 may further include the step of organizing data from the interrogation into objects representing HTTP responses.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method, comprising:
    performing, by one or more hardware processors and associated memory that implement a computing system:
        receiving a list of target devices in a network;
        distributing the list among a plurality of collection nodes, wherein individual ones of the plurality of collection nodes are configured to scan individual target devices to determine open port and protocol combinations on the individual target devices, and the collection nodes are deployed at a plurality of geographic locations;
        determining, based on a scan of the target devices by the collection nodes, that a target device in the network has an open port associated with a particular protocol;
        interrogating, by the collection nodes, the target device to perform a protocol-specific analysis of the open port of the target device, wherein the interrogation is performed by at least a first collection node at a first geographic location and a second collection node at a second geographic location;
        comparing results of the interrogation obtained by the first collection node and the second collection node to observe a difference in behavior of the target device when interrogated from the first geographic location and the second geographic location; and
        storing, in a database, results of the protocol-specific analysis including the observed difference in the behavior of the target device when interrogated from the first geographic location and the second geographic location.

2. The method of claim 1, wherein the first and second collection nodes are operated by different infrastructure providers.

3. The method of claim 1, wherein the interrogation is performed according to a configuration that specifies to interrogate the target device from different geographic locations.

4. The method of claim 1, further comprising the computer system:
    using the collection nodes to repeatedly interrogate the target device over time; and
    determining, based on the repeated interrogations, a configuration change of the target device over time.

5. The method of claim 1, further comprising the computing system:
    determining that the target device allows scanning from one or more specific collection locations; and
    selecting one or more collection nodes to scan the target device from the one or more specific collection locations.

6. The method of claim 1, wherein distributing the list of target devices among the collection nodes comprises distributing batches of target devices to individual ones of the collection nodes, wherein the batches are of a configurable size.

7. The method of claim 1, further comprising the computing system scaling up an amount of the collection nodes in response to an increase in demand for the collection nodes.

8. The method of claim 1, wherein:
the interrogation of the target device is performed as part of a monitoring of the network by the computing system; and
the method further comprises the computing system generating an alert about the target device based on the protocol-specific analysis of the target device.

9. The method of claim 1, further comprising the computing system:
storing in the database results of protocol-specific analysis performed on other target devices in the network; and
generating, on a user interface, a summarization of the target devices based on the results of the protocol-specific analysis stored in the database.

10. The method of claim 1, further comprising the computing system:
generating, on a user interface, the observed difference in the behavior of the target device when interrogated from the first geographic location and the second geographic location.

11. A system comprising:
one or more hardware processors and associated memory that implement a computing system, configured to:
receive a list of target devices in a network;
distribute the list among a plurality of collection nodes, wherein individual ones of the plurality of collection nodes are configured to scan individual target devices to determine open port and protocol combinations on the individual target devices, and the collection nodes are deployed at a plurality of geographic locations;
determine, based on a scan of the target devices by the collection nodes, that a target device in the network has an open port associated with a particular protocol;
interrogate, by the collection nodes, the target device to perform a protocol-specific analysis of the open port of the target device, wherein the interrogation is performed by at least a first collection node at a first geographic location and a second collection node at a second geographic location;
compare results of the interrogation obtained by the first collection node and the second collection node to observe a difference in behavior of the target device when interrogated from the first geographic location and the second geographic location; and
store, in a database, results of the protocol-specific analysis including the observed difference in the behavior of the target device when interrogated from the first geographic location and the second geographic location.

12. The system of claim 11, wherein the first and second collection nodes are operated by different infrastructure providers.

13. The system of claim 11, wherein the computer system is configured to:
use the collection nodes to repeatedly interrogate the target device over time; and
determine, based on the repeated interrogations, a configuration change of the target device over time.

14. The system of claim 11, wherein the computer system is configured to:
determine that the target device allows scanning from one or more specific collection locations; and
select one or more collection nodes to scan the target device from the one or more specific collection locations.

15. The system of claim 11, wherein the computing system is configured to:
store open port and protocol combination about the target devices in a queueing service.

16. The system of claim 11, wherein the computing system is configured to:
receive a request to opt out a particular target device from scanning; and
exclude the particular target device from the list of target devices.

17. The system of claim 11, the computing system is configured to:
scale up an amount of the collection nodes in response to an increase in demand for the collection nodes.

18. The system of claim 11, wherein:
the interrogation of the target device is performed as part of a monitoring of the network by the computing system; and
the computing system is configured to generate an alert about the target device based on the protocol-specific analysis of the target device.

19. The system of claim 11, wherein the computing system is configured to:
generate, on a user interface, the observed difference in the behavior of the target device when interrogated from the first geographic location and the second geographic location.

20. One or more non-transitory computer-readable storage media storing program instructions that when executed on one or more processors of a computing system cause the computing system to:
receive a list of target devices in a network;
distribute the list among a plurality of collection nodes, wherein individual ones of the plurality of collection nodes are configured to scan individual target devices to determine open port and protocol combinations on the individual target devices, and the collection nodes are deployed at a plurality of geographic locations;
determine, based on a scan of the target devices by the collection nodes, that a target device in the network has an open port associated with a particular protocol;
interrogate, by the collection nodes, the target device to perform a protocol-specific analysis of the open port of the target device, wherein the interrogation is performed by at least a first collection node at a first geographic location and a second collection node at a second geographic location;
compare results of the interrogation obtained by the first collection node and the second collection node to observe a difference in behavior of the target device when interrogated from the first geographic location and the second geographic location; and
store, in a database, results of the protocol-specific analysis including the observed difference in the behavior of the target device when interrogated from the first geographic location and the second geographic location.

* * * * *